W. Clement,
Fruit Box,
N° 55,061. Patented May 29, 1866.

Witnesses
Philip Dodge
John Blackie

Inventor;
W. Clement
By W. E. Dodge
Attorney.

UNITED STATES PATENT OFFICE.

W. CLEMENT, OF CHARLESTON, ILLINOIS.

IMPROVEMENT IN FRUIT-BASKETS.

Specification forming part of Letters Patent No. 55,061, dated May 29, 1866.

*To all whom it may concern:*

Be it known that I, W. CLEMENT, of Charleston, in the county of Cole and State of Illinois, have invented certain new and useful Improvements in the Method of Constructing Fruit-Boxes; and I do hereby declare that the following is a full, clear, and exact description of the same, reference being had to the accompany drawings, making part of this specification, and to the letters of reference marked thereon.

Figure 1:
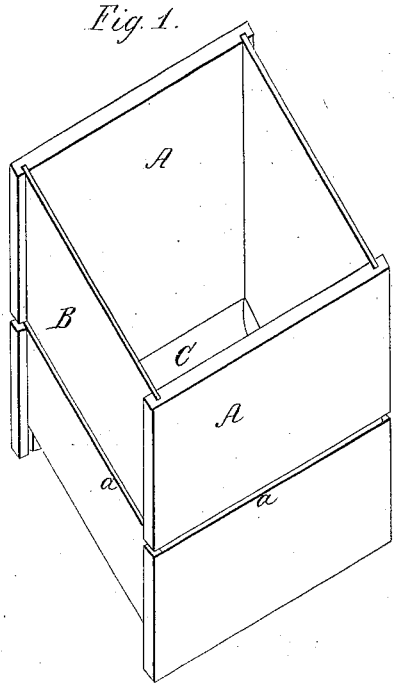
Figure 2:
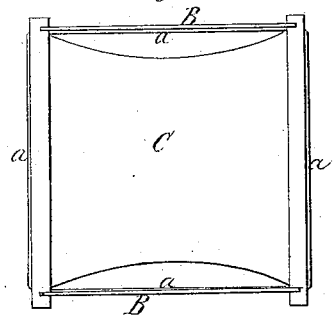
Figure 3:
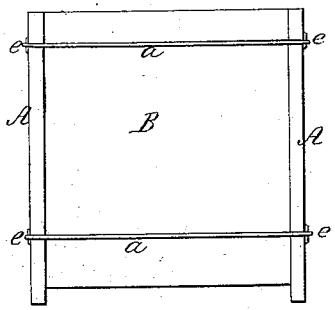

Figure 1 is a perspective view of my improved box complete; Fig. 2 is a top-plan view of the same; Fig. 3, a side view of the same slightly modified, and Fig. 4 a face view of one of the end pieces detached.

The nature of my invention consists in forming a box of two end pieces suitably grooved to receive and hold the side pieces and the bottom, the whole being held together by a piece of wire arranged in a novel manner.

To enable others skilled in the art to construct and use my invention, I will proceed to describe it.

Figure 4:
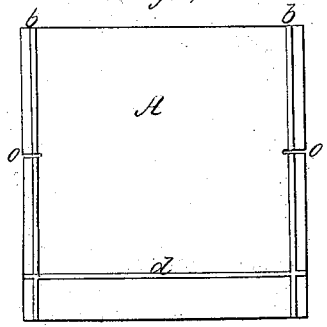

A represents the end pieces, which I construct of pieces of wood sawed or cut out thin, and of rectangular form, as shown in Fig. 4. A groove, $b$, is formed vertically near each edge on its face, and another groove, $d$, is formed in it transversely near the bottom.

B represents the side pieces, which are constructed of very thin pieces of wood. C represents the bottom, which is formed of a piece of wood similar to the sides B, the sides B and the bottom C being made of equal length. The grooves $b$ and $d$ are made of a width corresponding with the thickness of the side and bottom pieces.

A notch, $o$, is cut in each edge of the end pieces, A, deep enough to intersect or slightly pass the vertical grooves $b$, as shown in Fig. 4, and of proper size to receive a fine wire, $a$. If desired, a groove may be cut along the outer face of A from one to the other of the notches $o$, to permit the wire $a$ to lie therein, as shown in Fig. 1.

After having thus prepared the pieces that form the box, I take the two end pieces, A, and insert the ends of the side pieces, B, in the grooves $b$, the ends of the bottom C being also inserted in the grooves $d$, and then I pass a fine wire, $a$, around the whole, and twist its ends together, thus securing the parts firmly in place.

In Fig. 1 the wire $a$ is represented as passing outside of and around the ends and sides also; but in Fig. 2 the wire $a$ is shown passing along the inside of the side pieces, B, either plan being adopted, as may be preferred.

In Fig. 3 I have shown a modified form of applying the wire. In this case, instead of extending the wire entirely around the box, I simply pass it across the sides and secure it at each end by a small wedge or key, $e$. A single wire may be used centrally across each side to hold the end pieces together, or two pieces of wire may be used, one near the top and the other near the bottom, as there shown.

It will be observed that the edges of the bottom C are cut away on each side, as shown in Fig. 2, for the purpose of permitting the air to circulate through the openings thus formed, and thus keep the fruit in the box cool. It will also be observed that the end pieces, A, project beyond the sides and bottom of the box, so that when a number of these boxes are packed together in a larger box or crate for transportation a space for the free circulation of air is left all around each box, by which means the fruit is kept fresh and preserved much longer than it would otherwise be.

Another advantage of my plan of constructing boxes is, that after they have been emptied, or before being filled, they can be readily taken apart by simply slipping out the sides, when all the parts can be packed in a very small space, and compactly, for transportation, and be as readily set up again, ready for use, without the aid of any tool, and without using either screws, pegs, or nails of any kind.

The entire work of preparing the parts ready to put together can be done by machinery, and thus I am enabled to produce a very cheap and simple box for holding small fruits, and one that is well adapted to the purposes for which it is intended.

Having thus fully described my invention, what I claim is—

A fruit-box constructed substantially as herein described.

W. CLEMENT.

Witnesses:
PERRY L. CLEMENT,
W. D. CROFOOT.